(12) United States Patent
Li

(10) Patent No.: US 11,774,980 B2
(45) Date of Patent: Oct. 3, 2023

(54) METHOD FOR CONTROLLING CLEANING OF ROBOT, CHIP, AND ROBOT CLEANER

(71) Applicant: AMICRO SEMICONDUCTOR CO., LTD., Guangdong (CN)

(72) Inventor: Yongyong Li, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 233 days.

(21) Appl. No.: 17/295,887

(22) PCT Filed: Nov. 8, 2019

(86) PCT No.: PCT/CN2019/116681
§ 371 (c)(1),
(2) Date: May 21, 2021

(87) PCT Pub. No.: WO2020/103707
PCT Pub. Date: May 28, 2020

(65) Prior Publication Data
US 2022/0129002 A1 Apr. 28, 2022

(30) Foreign Application Priority Data

Nov. 23, 2018 (CN) .......................... 201811409477.X

(51) Int. Cl.
*G05D 1/02* (2020.01)

(52) U.S. Cl.
CPC ......... *G05D 1/0225* (2013.01); *G05D 1/0242* (2013.01); *G05D 2201/0203* (2013.01)

(58) Field of Classification Search
CPC ............... G05D 1/0225; G05D 1/0242; G05D 2201/0203; G05D 1/0274; G05D 1/0219; G05D 1/0285; A47L 2201/02; A47L 2201/04
See application file for complete search history.

(56) References Cited

U.S. PATENT DOCUMENTS

| 2005/0171644 | A1  | 8/2005 | Tani |
| 2016/0271795 | A1* | 9/2016 | Vicenti .................... B25J 9/163 |
| 2016/0274588 | A1  | 9/2016 | Tanaka |

FOREIGN PATENT DOCUMENTS

| CN | 102138769 A | 8/2011 |
| CN | 103099586 A | 5/2013 |
| CN | 105425801 A | 3/2016 |
| CN | 106805856 A | 6/2017 |
| CN | 107368079 A | 11/2017 |
| CN | 107440635 A | 11/2017 |
| CN | 107898393 A | 4/2018 |
| CN | 109240312 A | 1/2019 |
| JP | 2005211366 A | 8/2005 |

* cited by examiner

*Primary Examiner* — Bao Long T Nguyen
(74) *Attorney, Agent, or Firm* — Gang Yu

(57) ABSTRACT

A method for controlling cleaning of a robot, a chip and a robot cleaner. In the method for controlling cleaning of a robot, when the robot is located at a position of a charging base, the robot is controlled to clean a preset region around the charging base first, and then a cleaning restricted zone is formed, such that the robot will not enter the restricted zone in the subsequent cleaning process.

20 Claims, 5 Drawing Sheets

METHOD FOR CONTROLLING CLEANING OF ROBOT, CHIP, AND ROBOT CLEANER

CROSS-REFERENCE TO RELATED APPLICATIONS

The present disclosure takes the Chinese Patent Application No. 201811409477.X, filed on Nov. 23, 2018, and entitled "method for controlling cleaning of robot, chip, and robot cleaner", as the priority, the entire contents of which are incorporated herein by reference.

TECHNICAL FIELD

The present disclosure relates to the field of smart robots, and in particular, to a method for controlling cleaning of a robot, a chip, and a robot cleaner.

BACKGROUND

There are multiple SLAM algorithms, such as laser scanning navigation-based algorithm and visual navigation-based algorithm, the cost of the former is relatively high, the cost of a common one is between 300 and 500 RMB, and Xiaomi robot cleaner also relates to an SLAM algorithm achieved on the basis of this principle; and the cost of the latter is relatively low, but the technical threshold is relatively high, and currently, there are a few robot cleaners which are based on visual navigation and achieve good effects on market, for example, Roomba 980, which has a relatively good effect. However, the described two algorithms both involve relatively high costs. Currently, most low-cost map navigation solutions on market are still based on gyroscopes. However, for solutions merely based on gyroscopes, it requires a high technical threshold to achieve accurate map and achieve both route planning and high navigation efficiency in various complex environments. As for current robot cleaners on market, a majority of the robot cleaners are still based on random algorithms. Along with the emergence of map navigation solutions, various shortcomings of the random algorithms are gradually enlarged, for example, the robot is not targeted and has low cleaning efficiency. Robot cleaners based on SLAM algorithms newly emerged in recent years also present technologies of various companies, and these technologies all have pros and cons.

SUMMARY

The specific technical solutions in some embodiments of the present disclosure are as follows:

A method for controlling cleaning of a robot, comprising the following steps: step S1: the robot receiving a control instruction for starting cleaning, and determining whether the robot is currently located at a position of a charging base, when the robot is currently located at the position of a charging base, proceeding to step S2, and otherwise, proceeding to step S4; step S2: the robot leaving the charging base, and performing planned cleaning in a preset range with the charging base as a base point, and after cleaning, proceeding to step S3; step S3: the robot performing cleaning with a current cleaning end point as a base point in a region outside the preset range according to a principle of proximity, and when the principle of proximity is not applicable, proceeding to step S5; step S4: the robot starting to perform planned regional cleaning with a current position point as a base point, and performing planned regional cleaning in other regions according to the principle of proximity, and when the principle of proximity is not applicable, proceeding to step S5; and step S5: selecting a position point in an uncleaned region having the shortest navigation distance from a current cleaning end point as a base point, then performing planned regional cleaning in the uncleaned region according to the principle of proximity, and in a process of cleaning, when the principle of proximity is not applicable, selecting a position point in a uncleaned region having the shortest navigation distance from a current cleaning end point as a base point, continuing to perform planned regional cleaning in the uncleaned region according to the principle of proximity, and so on, until all regions are cleaned; wherein the principle of proximity means that the robot preferentially selects an uncleaned region, which is in a direction same as the current cleaning direction and takes a region boundary of a cleaned region corresponding to the base point as an adjacent side, to perform the planned regional cleaning; then the robot selects an uncleaned region, which is in a direction perpendicular to the current cleaning direction and takes a region boundary of the cleaned region corresponding to the base point as an adjacent side, to perform the planned regional cleaning; and finally the robot selects an uncleaned region, which is in a direction perpendicular to the current cleaning direction and takes another region boundary opposite to the region boundary of the cleaned region corresponding to the base point as an adjacent side, to perform the planned regional cleaning; wherein the planned regional cleaning refers to a manner in which the robot cleans a region with a preset length and a preset width according to a predetermined trajectory form; and wherein the cleaning direction refers to a direction in which the cleaning range extends from one end to the other end of a region when the robot performs the planned regional cleaning.

Optionally, in step S2, performing the planned cleaning on the preset range with the charging base as the base point specifically comprises: the robot walking forward in a direction directly in front of the charging base, starting to perform 弓-shaped planned cleaning on a first region at one side directly in front of the charging base, after cleaning, then returning to a direct front direction of the charging base along a region boundary of the first region, and then performing 弓-shaped planned cleaning on a second region at the other side directly in front of the charging base; wherein the first region and the second region have the same length, the first region and the second region have the same width, a sum of a length of the first region and a length of the second region is equal to a length of the preset range, and the width of the first region or the width of the second region is equal to the width of the preset range.

Optionally, the step S3 comprises: step S31: the robot determining the current cleaning end point as the base point, and then determining whether there is at least one uncleaned region in the current cleaning direction, when there is the at least one uncleaned region in the current cleaning direction, proceeding to step S32, and otherwise, proceeding to step S34; step S32: the robot selecting one of the at least one uncleaned region, which is in a direction same as the current cleaning direction and takes a region boundary of a currently-cleaned region corresponding to the base point as an adjacent side, to perform the planned regional cleaning, the cleaning direction being maintained as the current cleaning direction, and then proceeding to step S33; step S33: the robot determining whether to clean to a physical boundary or a virtual boundary of the uncleaned region along the current cleaning direction, when clean to the physical boundary or the virtual boundary, proceeding to step S34, and otherwise, the robot continuing cleaning, until the robot completes planned regional cleaning of the current region, and then returning to step S31; step S34: the robot determining a current cleaning end point as a base point, and then determining whether there is at least one uncleaned region in a direction perpendicular to the current cleaning direction, when there is the at least one uncleaned region in the direction perpendicular to the current cleaning direction, proceeding to step S35, and otherwise, proceeding to step S5; and step S35: the robot selecting one of the at least one uncleaned region, which is in the direction perpendicular to the current cleaning direction and towards a first side of a currently-cleaned region and takes a region boundary of the first side of the currently-cleaned region as an adjacent side, to perform planned regional cleaning, the cleaning direction being changed to a direction towards the first side of the currently-cleaned region, and after cleaning, returning to step S31; and when there is no uncleaned region in the direction towards the first side of the currently-cleaned region, the robot selecting an uncleaned region, which is in a direction perpendicular to the current cleaning direction and towards a second side of the currently-cleaned region and takes a region boundary of the second side of the currently-cleaned region as an adjacent side, to perform planned regional cleaning, the cleaning direction being changed to a direction towards the second side of the currently-cleaned region, and after cleaning, returning to step S31; wherein the first side of the currently-cleaned region is a side of the currently-cleaned region where the base point is located, and the second side of the currently-cleaned region is the other side, opposite to the first side, of the currently-cleaned region.

Optionally, S4 comprises; step S41; the robot determining the current position point as a base point, then walking forward, and starting to perform the planned regional cleaning on a region at one side directly in front of the robot, the cleaning direction being a direction towards the side directly in front of the robot, and after cleaning, proceeding to step S42; step S42: the robot taking a current cleaning end point as a base point, and then determining whether there is at least one uncleaned region in a current cleaning direction, when there is the at least one uncleaned region in the current cleaning direction, proceeding to step S43, and otherwise, proceeding to step S45; step S43: the robot selecting one of the at least one uncleaned region, which is in a direction same as the current cleaning direction and takes a region boundary of a currently-cleaned region corresponding to the base point as an adjacent side, to perform planned regional cleaning, the cleaning direction being maintained as the current cleaning direction, and then proceeding to step S44; step S44: the robot determining whether to clean to a physical boundary or a virtual boundary of the uncleaned region along the current cleaning direction, when clean to the physical boundary or the virtual boundary, proceeding to step S45, and otherwise, the robot continuing cleaning, until the robot completes the planned regional cleaning of the current region, and then returning to step S42; step S45: the robot determining a current cleaning end point as a base point, and then determining whether there is at least one uncleaned region in a direction perpendicular to the current cleaning direction, when there is the at least one uncleaned region in the direction perpendicular to the current cleaning direction, proceeding to step S46, and otherwise, proceeding to step S5; and step S46: the robot selecting one of the at least one uncleaned region, which is in the direction perpendicular to the current cleaning direction and towards a first side of a currently-cleaned region and takes a region boundary of the first side of the currently-cleaned region as an adjacent side, to perform planned regional cleaning, the cleaning direction being changed to a direction towards the first side of the currently-cleaned region, and after the planned regional cleaning, returning to step S42; and when there is no uncleaned region in the direction towards the first side of the currently-cleaned region, the robot selecting one of the at least one uncleaned region, which is in the direction perpendicular to the current cleaning direction and towards a second side of the currently-cleaned region and takes a region boundary of the second side of the currently-cleaned region as an adjacent side, to perform planned regional cleaning, the cleaning direction being changed to the direction towards the second side of the currently-cleaned region, and after cleaning, returning to step S42; wherein the first side of the currently-cleaned region is a side of the currently-cleaned region where the base point is located, and the second side of the currently-cleaned region is the other side, opposite to the first side, of the currently-cleaned region.

Optionally, the robot performing the planned regional cleaning specifically comprises the following steps: step S61: from the base point, the robot performing the planned cleaning in a 弓-shaped trajectory form, proceeding to step S62; step S62: the robot determining in real time whether there is at least one cleaning-missed region during the cleaning process, when there is the at least one cleaning-missed region during the cleaning process, proceeding to step S63, and otherwise, continuing the planned cleaning, until the planned regional cleaning is completed; and step S63: the robot determining a current position point as a supplementary-cleaning starting point, and starting to perform supplementary cleaning on the at least one cleaning-missed region from the supplementary-cleaning starting point, after the supplementary cleaning, the robot returning to the supplementary-cleaning starting point, continuing to perform planned cleaning on a remaining uncleaned region, and returning to step S62; wherein the completion of the planned regional cleaning means that when the robot cleans to a region boundary, a virtual boundary or a physical boundary along the cleaning direction, the cleaning of the region is completed.

Optionally, in step S61, the step of from the base point, the robot performing planned cleaning in the 弓-shaped trajectory form comprises the following steps: step S611: from the base point, the robot walking along a region boundary of the region, and then proceeding to step S612; step S612: the robot determining whether at least one obstacle is detected, when the obstacle is detected, proceeding to step S613, otherwise, continuing to walk along the region boundary of the region until the robot returns to the base point, and at this time, the robot walking within the range of the region boundary to delineate an inner region, and then the robot performing the planned cleaning in the inner region which is delineated in the 弓-shaped trajectory form; and step S613: the robot walking along an edge at a side of the obstacle located in the range of the region, determining whether the region boundary is reached, and otherwise, continuing to walk along the edge, and when the region boundary is reached, continuing to walk along the region boundary, and returning to step S612.

Optionally, in step S62, determining in real time whether there is the at least one cleaning-missed region during the cleaning process specifically comprises the following steps: step S621: the robot determining whether there is at least one closed-loop uncleaned block in a range through which the robot walks along the cleaning direction, when there is the at least one closed-loop uncleaned block, proceeding to step S622, and otherwise, continuing cleaning; and step S622: the robot determining whether there is, in the uncleaned block, at least one uncleaned boundary line having a length greater than a preset distance, when there is the at least one closed-loop uncleaned block, determining that there is the at least one cleaning-missed region, and otherwise, determining that there is no cleaning-missed region; wherein the closed-loop uncleaned block refers to an uncleaned region enclosed by at least one kind of region boundary, an obstacle boundary line and the uncleaned boundary line.

Optionally, in step S63, the step of the robot determining the current position point as the supplementary-cleaning starting point, and starting to perform supplementary cleaning on the cleaning-missed region from the supplementary-cleaning starting point specifically comprises: step S631: the robot determining the current position point as the supplementary-cleaning starting point and searching a map constructed in a walking process, and then proceeding to step S632; step S632: the robot selecting a supplementary-cleaning entrance, in the cleaning-missed region, having the shortest navigation distance from the supplementary-cleaning starting point, selecting, as a first supplementary-cleaning point, an endpoint position having a shorter distance from the supplementary-cleaning starting point in two endpoint positions of the shortest supplementary-cleaning entrance, and selecting another endpoint position in the shortest supplementary-cleaning entrance as a second supplementary-cleaning point, and then proceeding to step S633; and step S633: the robot navigating to the first supplementary-cleaning point, starting to walk and clean towards the second supplementary-cleaning point, and performing 弓-shaped planned cleaning on the cleaning-missed region by taking, as the current cleaning direction, a direction towards the interior of the cleaning-missed region and parallel to the cleaning direction of the planned regional cleaning, until the robot completes the cleaning of the cleaning-missed region, and then the supplementary cleaning ending.

A chip, for storing program instructions, wherein the program instructions are used to control a robot to execute the method for controlling cleaning as described in any of the described solutions.

A robot cleaner, comprising a main control chip, wherein the main control chip is the described chip.

DETAILED DESCRIPTION OF THE EMBODIMENTS

Hereinafter, the technical solutions in the embodiments of the present disclosure are described in detail with reference to the drawings in the embodiments of the present disclosure. It should be understood that the specific embodiments described below are only intended to explain some embodiments of the present disclosure, but not to limit some embodiments of the present disclosure. In the following description, specific details are given to provide a thorough understanding of the embodiments. However, it will be understood by a person of ordinary skill in the art that embodiments may be implemented without these specific details. For example, circuits may be shown in block diagrams, to avoid obscuring the embodiments in unnecessary details. In other instances, well-known circuits, structures, and techniques may not be shown in detail in order not to obscure the embodiments.

Figure 1:
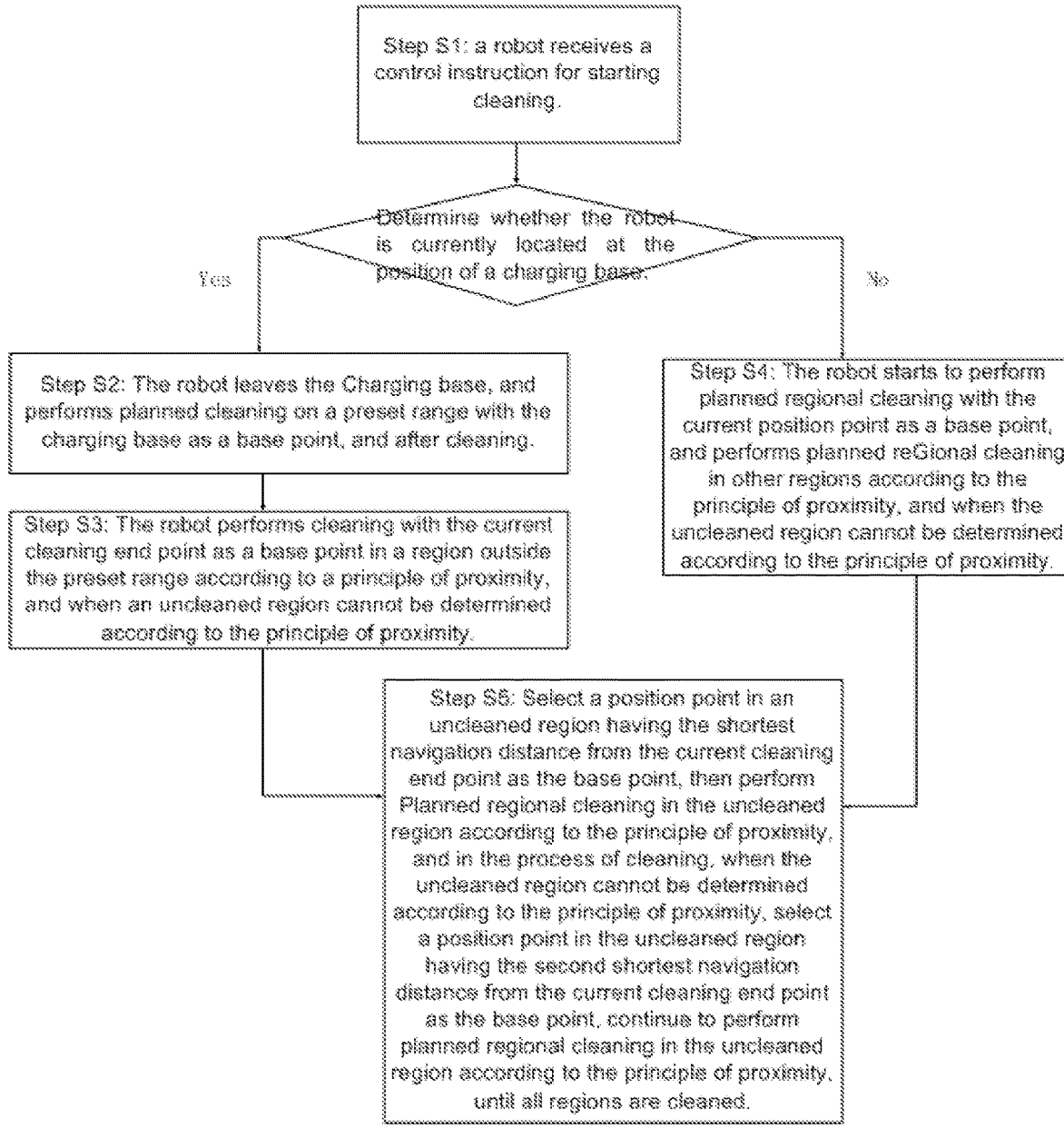
FIG. 1 is a flowchart schematic diagram of a method embodiment for controlling cleaning of a robot according to some embodiments of the present disclosure.

A method for controlling cleaning of a robot, and the robot is a smart robot capable of moving autonomously, and the cleaning is not limited to floor cleaning and dust suction, and can also refer to cleaning functions such as floor mopping, polishing or waxing. That is, according to the method for controlling cleaning, the robot can perform cleaning, dust suction, floor mopping, floor polishing or waxing. As shown in FIG. 1, the method for controlling cleaning comprises the following steps: in step S1, the robot receives a control instruction for starting cleaning, and determines whether the robot is currently located at the position of a charging base, in some embodiments, the control instruction is a control signal sent by a user through a remote control device such as a remote controller or a smart phone, and in some other embodiments, the control instruction is a control signal generated by a user operating a key of a control panel on the robot body, and the method for determining whether the robot is located at the charging base can be performed by detecting the electrical signal state of a contact sheet of a charging end of the robot; when the robot detects that it is currently located at the position of the charging base, the robot proceeds to step S2; and when the robot detects that it is currently not located at the position of the charging base, the robot proceeds to step S4.

In step S2, the robot first moves backward, after leaving the charging base, the robot turns 180° in place, and faces the direct front direction of the charging base, thereby leaving the charging base. After leaving the charging base, the robot starts to perform planned cleaning in a preset range with the charging base as a base point. The preset range may be correspondingly set according to specific product design requirements, and In some embodiments, is set as a rectangular region of 2 m*2 m. Specifically, the charging base is located at a midpoint of one side of the rectangular region, the other opposite side of the rectangular region is located directly in front of the charging base, and thus, by taking the direct front direction of the charging base as a dividing line, the rectangular region can be divided into 1 m*2 m rectangular regions which are symmetric with each other. The robot performs planned cleaning in the two rectangular regions respectively. By cleaning the preset range first, the cleaning of the peripheral region of the charging base can be completed in cases where the accumulated walking error of the robot is not very large, and a restricted zone is divided; and the robot does not enter the restricted zone during subsequent cleaning, thereby avoiding the problem that the robot easily collides with the charging base and cannot effectively return to the base for charging caused by large accumulated walking error after subsequent cleaning for a long time. Of course, the shape and size of the set preset range can be different from this. The planned cleaning mode can also be set according to specific product design requirements, for example, set as 弓-shaped planned cleaning, " 回 "-shaped planned cleaning, or radiation-form planned cleaning, etc. the planned cleaning in this embodiment and some other subsequent embodiments is a cleaning mode according to 弓-shaped trajectory form. After cleaning the preset range, the robot proceeds to step S3. In step S3, the robot takes a current cleaning end point as a base point, and when the robot is cleaning the preset range, the current cleaning end point is the last position point at which the traversal cleaning of the preset range is completed; and when the robot is cleaning other regions, the current end point is the last position point at which the traversal cleaning of the corresponding range is completed. The robot cleans regions outside the preset range according to principle of proximity and on the basis of the base point. The principle of proximity means that the robot preferentially selects an uncleaned region, which is in a direction same as the current cleaning direction and takes a region boundary of a cleaned region corresponding to the base point as an adjacent side, to perform planned regional cleaning; when there is no corresponding region, then the robot selects an uncleaned region, which is in a direction perpendicular to the current cleaning direction and takes a region boundary of a cleaned region corresponding to the base point as an adjacent side, to perform planned regional cleaning; and when there is still no corresponding region, finally the robot selects an uncleaned region, which is in a direction perpendicular to the current cleaning direction and takes another region boundary opposite to the region boundary of a cleaned region corresponding to the base point as an adjacent side, to perform planned regional cleaning. The planned regional cleaning refers to a manner in which the robot cleans a region with a preset length and a preset width according to a predetermined trajectory form. The preset length and the preset width can be set according to specific design requirements, for example, the preset length is set as 3 m, 4 m or 5 m, the preset width can also be set as 3 m, 4 m or 5 m, and the preset length can be the same as or different from the preset width. The predetermined trajectory line form can be set according to specific design requirements, and can be set as a 弓-shaped trajectory form, a 回-shaped trajectory form or a radiation trajectory form, etc. The cleaning direction refers to a direction in which the cleaning range extends from one end to the other end of the region when the robot performs planned regional cleaning. when the principle of proximity is not applicable, that is, none of the described selectable regions exists, the robot proceeds to step S5. By controlling the robot to perform planned regional cleaning according to the principle of proximity, this step can improve the cleaning efficiency and orderliness of the robot.

In step S4, the robot starts planned regional cleaning by taking a current position point as a base point, and performs planned regional cleaning of other regions according to the principle of proximity, and when the principle of proximity is not applicable, the robot proceeds to step S5.

In step S5: the robot selects a position point in an uncleaned region having the shortest navigation distance from a current cleaning end point as the base point, then performs planned regional cleaning in the uncleaned region according to the principle of proximity, and in the process of cleaning, when the principle of proximity is not applicable, the robot selects a position point in the uncleaned region having the second shortest navigation distance from the current cleaning end point as the base point, continues to perform planned regional cleaning in the uncleaned region according to the principle of proximity, and so on, until all regions are cleaned; wherein the navigation distance refers to the length of a path, through which the robot can walk from the current position point to a target position point, as determined by the robot searching a map. when there are multiple paths to reach the target position point, the path having the shortest length has the shortest navigation distance. The map is a grid map constructed by the robot during walking, and the grid map is composed of a large number of grid units. The robot marks walked grid units as walked units, and marks corresponding grid units in which obstacles are detected as obstacle units, etc. Each grid unit can be set as a square grid taking half of the width of the robot body as a side length, or set as a square grid taking the width of the whole body robot as a side length. Several grid units together constitute planned cleaning region, i.e. a grid region.

In the method for controlling cleaning of a robot, when the robot is located at the position of a charging base, the robot is controlled to clean a preset region around the charging base first, and then a cleaning restricted zone is formed, such that the robot will not enter the restricted zone in the subsequent cleaning process, preventing the robot from bumping into the charging base accidentally, thereby changing the position of the charging base, improving the accuracy rate of returning to the base and increasing the efficiency of returning to the base of the robot.

Figure 2:
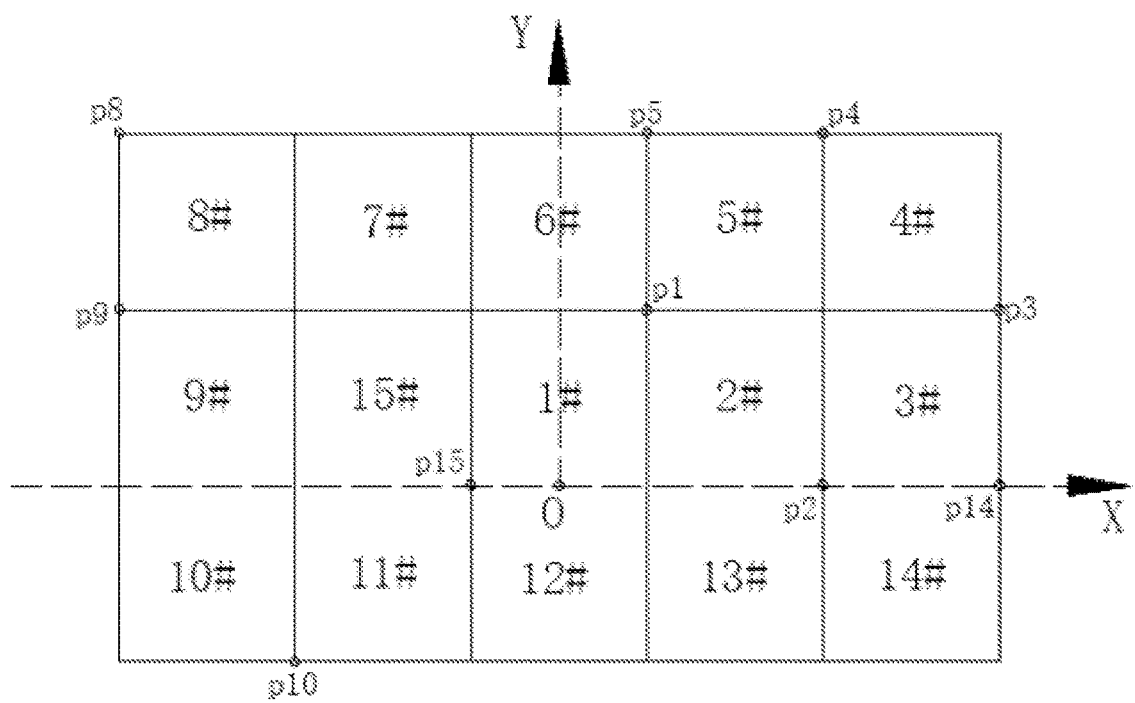
FIG. 2 is a schematic diagram of cleaning planning analysis when the robot is located at the position of a charging base.

Specifically, as shown in FIG. 2, each grid represents planned cleaning region, a point O is the position point where the charging base is located, and the Y-axis direction is a direct front direction of the charging base. When receiving a control instruction for starting cleaning, the robot determines that it is currently located at the position of the point O of the charging base, the robot leaves the charging base, turns 180°, and faces the Y-axis direction. Then, the robot walks forward, performs planned cleaning on a preset range 1# with the point O as a base point, and when cleaning to a point p1, the cleaning of the preset range is completed. At this time, the cleaning direction of the robot is in an X-axis positive direction. Then, taking the point p1 as a base point, the robot selects an uncleaned region 2# adjacent to the preset range 1# in the X-axis positive direction as a to-be-cleaned region, and performs planned cleaning on the region 2#. When reaching a point p2, the cleaning of the region 2# is completed. Likewise, the robot continues planned cleaning in the X-axis positive direction and cleans to a point p3, at this time, there is no cleanable region in the current cleaning direction (the X-axis positive direction), and thus the robot selects, as a to-be-cleaned region, an uncleaned region 4# which is in the Y-axis direction perpendicular to the X-axis direction and takes a region boundary corresponding to the point p3 (i.e., the upper boundary of the region 3#) as an adjacent side, and then performs planned cleaning on the region 4# with the Y-axis positive direction as the cleaning direction. When reaching a point p4, the cleaning of the region 4# is completed. As there is no other cleanable region in the current cleaning direction (the Y-axis positive direction), the robot performs planned cleaning on a region 5# by taking the point p4 as the base point and taking the X-axis negative direction as the cleaning direction. When reaching a point p5, the cleaning of the region 5# is completed, and then the robot continues to keep cleaning to a point p8 by taking the X-axis negative direction as the cleaning direction, and completes planned cleaning of regions 6#, 7# and 8#. When the robot is located at the point p8, there is no cleanable region in the X-axis negative direction, and there is also no cleanable region in the Y-axis positive direction, and therefore the robot selects an uncleaned region 9# in the Y-axis negative direction as a to-be-cleaned region, walks from the point p8 to the point p9, and then from the point p9, performs planned cleaning on the region 9# by taking the Y-axis negative direction as the cleaning direction. When cleaning to a point p10, the planned cleaning of regions 9# and 10# are completed. Then, the robot cleans to a point p14 by taking the X-axis positive direction as the cleaning direction, and completes planned cleaning of regions 11#, 12#, 13# and 14#. At the point p14, the robot has no selectable uncleaned region in the X-axis positive direction, the Y-axis positive direction, or the Y-axis negative direction. Thus, the robot starts to search a map, selects a point p15 of an uncleaned region 15# having the shortest navigation distance from the point p14 as a base point, and starts planned cleaning on the region 15# from the point p15. In some embodiments, the cleaning direction is the X-axis negative direction or the Y-axis positive direction. As the area of the region 15# is just the size of planned cleaning region, after the cleaning, the cleaning of all the regions is completed. when the area of the region 15# is greater than the size of planned cleaning region, the cleaning of adjacent regions is performed according to the described principle of proximity; and when there are still non-adjacent uncleaned regions except the region 15#, the robot continues to clean other regions by means of map search and navigation, until all the regions are cleaned.

Figure 3:
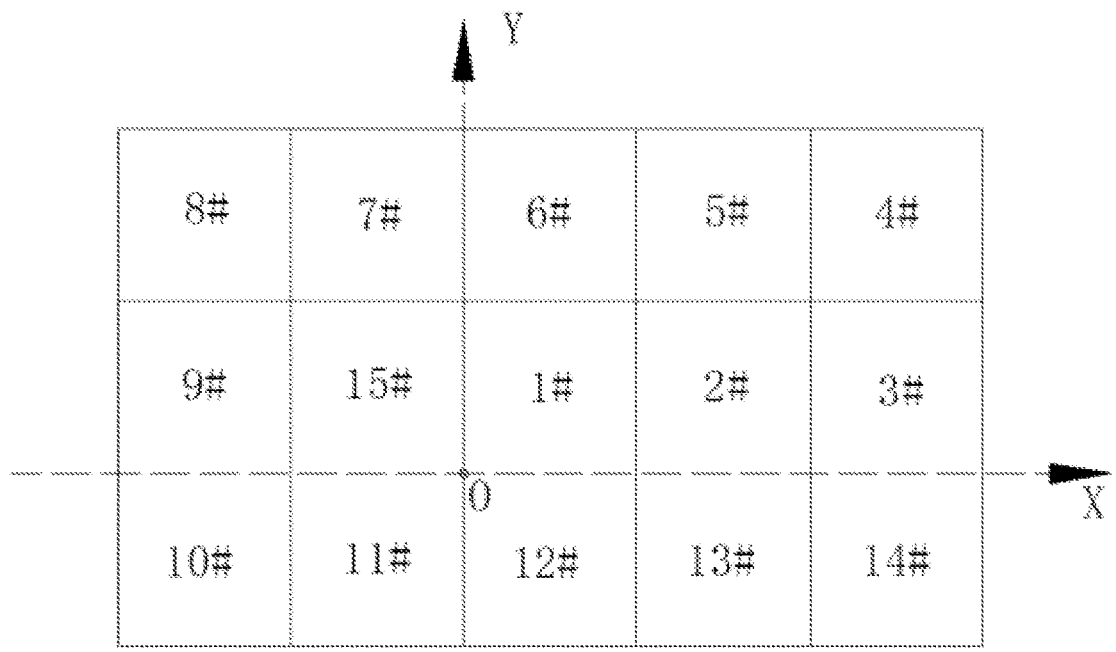
FIG. 3 is a schematic diagram of cleaning planning analysis when the robot is not located at the position of the charging base.

As shown in FIG. 3, the cleaning method of the robot is similar to that in the described embodiments, and the difference is that: when receiving a control instruction for starting cleaning, the robot is not located at the position of the charging base, but is located at any position point, i.e, point 0, on the ground. At this time, the robot does not need to first clean a region of a preset range, that is, the robot does not need to divide a restricted zone first, and can directly perform planned regional cleaning from the point 0. From the point 0, the robot walks forward in the Y-axis positive direction, performs planned cleaning on a region 1#, and then successively completes cleaning of regions 1# to 15# in the same manner as that in the described embodiments.

Figure 4:
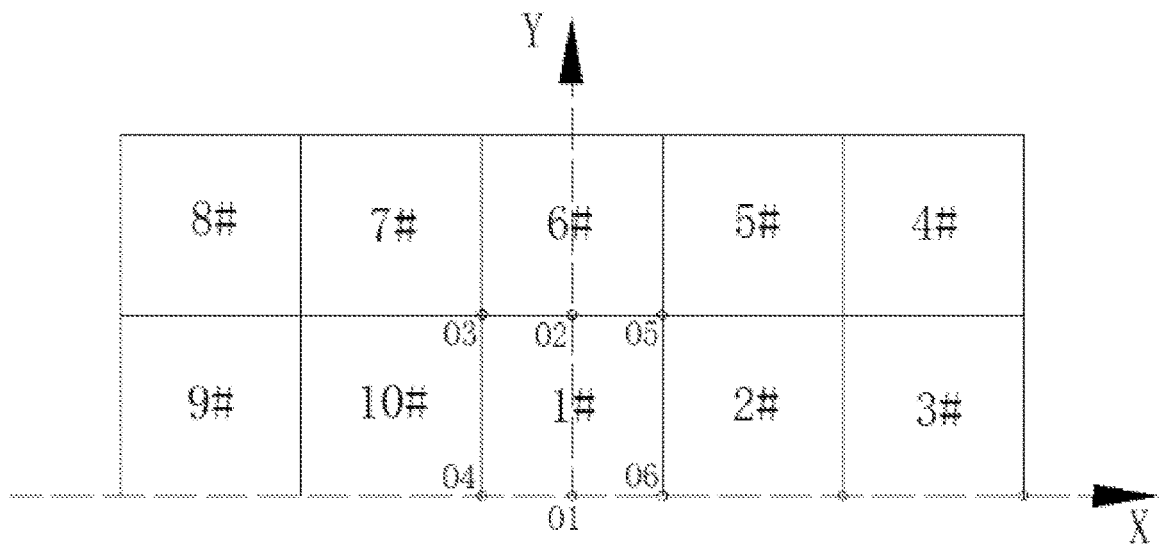
FIG. 4 is a schematic analysis diagram of the robot performing planned cleaning in a preset range with the charging base as a base point.

In some embodiment, in step S2, the step of performing planned cleaning in a preset range with the charging base as the base point specifically comprises the following steps: the robot walking forward in a direction directly in front of the charging base, starting to perform 弓-shaped planned cleaning on a first region at one side directly in front of the charging base, after cleaning, then returning to a direct front direction of the charging base along a region boundary of the first region, and then performing 弓-shaped planned cleaning on a second region at the other side directly in front of the charging base; wherein the first region and the second region have the same length, the first region and the second region have the same width, a sum of a length of the first region and a length of the second region is equal to a length of the preset range, and a width of the first region or a width of the second region is equal to a width of the preset range. Specifically, as shown in FIG. 4, the position point where the charging base is located is a point 01, and the direct front direction of the charging base is the Y-axis positive direction. The first region is a region enclosed by 01, 02, 03 and 04, and the second region is a region enclosed by 01, 02, 05, and 06. From the point 01, the robot walks in the Y-axis positive direction towards the point 02, and performs 弓-shaped cleaning on the first region by taking the X-axis negative direction as the cleaning direction. When reaching the point 04, the planned cleaning of the first region is completed. Then, the robot walks to the point 01 along the boundary 0401, then from the point 01 again, the robot walks towards the point 02 along the Y-axis positive direction, and performs 弓-shaped cleaning on the second region by taking the X-axis positive direction as the cleaning direction. When reaching the point 06, the planned cleaning of the second region is completed. Thus, the cleaning of the preset range 03040506 is completed, and the restricted zone is determined. The problem that the robot easily collides with the charging base and cannot effectively return to the base for charging caused by large accumulated walking error after subsequent cleaning for a long time is avoided. In addition, by making the area of the preset range equal to the size of the planned cleaning region (region 2#, 3# or 4#, etc.), and diving the preset range into a first region and a second region which are the same, the cleaning of the robot is more organized and more orderly, and the cleaning efficiency of the robot can also be increased.

In some embodiment, the step S3 specifically comprises the following steps: in step S31, the robot determines the current cleaning end point as the base point, and then determines whether there is at least one uncleaned region in the current cleaning direction, when there is the at least one uncleaned region in the current cleaning direction, the robot proceeds to step S32, and otherwise, the robot proceeds to step S34; in step S32, the robot selects an uncleaned region, which is in a direction same as the current cleaning direction sand takes a region boundary of a currently-cleaned region corresponding to the base point as an adjacent side, to perform planned regional cleaning, the cleaning direction being maintained as the current cleaning direction, and then the robot proceeds to step S33; in step S33, the robot determines whether to dean to a physical boundary or a virtual boundary of the uncleaned region along the current cleaning direction, when clean to the physical boundary or the virtual boundary, the robot proceeds to, step S34, and otherwise, the robot continues cleaning, until the robot completes planned regional cleaning of the current region, and then returning to step S31; in step S34, the robot determines a current cleaning end point as a base point, and then determines whether there is at least one uncleaned region in a direction perpendicular to the current cleaning direction, when there is the at least one uncleaned region in the direction perpendicular to the current cleaning direction, the robot proceeds to step S35 and otherwise, the robot proceeds to step S5; and in step S35: the robot selects one of the at least one uncleaned region, which is in the direction perpendicular to the current cleaning direction and towards a first side of a currently-cleaned region and takes a region boundary of the first side of the currently-cleaned region as an adjacent side, to perform planned regional cleaning, the cleaning direction is changed to the direction towards the first side of the currently-cleaned region, and after cleaning, return to step S31; and when there is no uncleaned region in the direction towards the first side of the currently-cleaned region, the robot selects an uncleaned region, which is in a direction perpendicular to the current cleaning direction and towards a second side of the currently-cleaned region and takes a region boundary of the second side of the currently-cleaned region as an adjacent side, to perform planned regional cleaning, the cleaning direction is changed to the direction towards the second side of the currently-cleaned region, and after cleaning, return to step S31; and the first side of the currently-cleaned region is a side of the currently-cleaned region where the base point is located, and the second side of the currently-cleaned region is the other side, opposite to the first side, of the currently-cleaned region.

Figure 5:
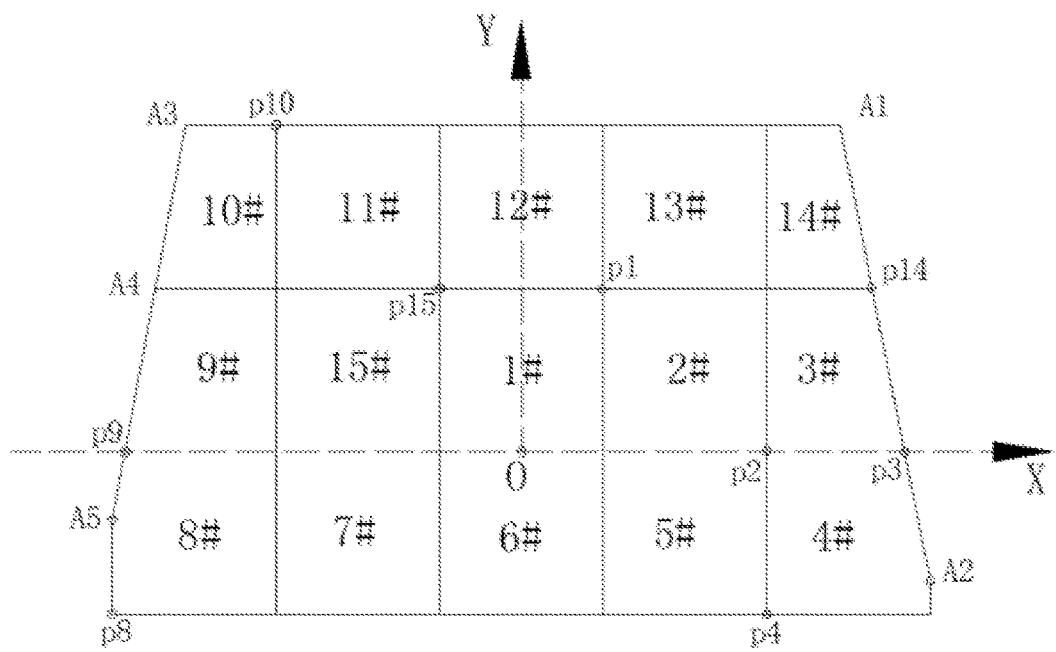
FIG. 5 is a schematic analysis diagram of the robot performing planned cleaning in regions outside the preset range and near the charging base according to principle of proximity.

Specifically, as shown in FIG. 5, the robot completes cleaning of a region 1# from a point 0 and by taking the X-axis positive direction as the cleaning direction, and then reaches a point p1; next, the robot completes cleaning of a region 2#, and reaches a point p2; then, the robot continues to clean a region 3# from the point p2. In the process of cleaning the region 3#, the robot detects a physical boundary p3p14 of the region in the current cleaning direction; and the existence of this physical boundary indicates that there is no cleanable region in this region when continuing to extend in the X-axis positive direction. Therefore, after the robot cleans to a point p3, even when the cleaning area does not reach the region of a standard region, the robot does not continue to clean, and the point p3 is taken as a cleaning end point of, this region. Next, the robot starts to walk towards the point p2 from the point p3, and cleans a region 4# by taking the Y-axis negative direction as the cleaning direction. Although there is also a physical boundary p3A2 in the region 4#, the boundary is not in the current cleaning direction, that is, this boundary does not indicate whether there is still an uncleaned region in the Y-axis negative direction. Thus, the robot will continue to clean until a point p4 at which the cleaning is ended. At this time, there is no cleanable region in the Y-axis negative direction, and the robot cleans a region 5# by taking the point p4 as a base point and taking the X-axis negative direction as the cleaning direction, and sequentially completes cleaning of regions 6#7# and 8#. Similarly, in the region 8#, the robot also detects a boundary line constituted by a physical boundary p9A5 and a virtual boundary A5p8, and thus when cleaning to the point p8, the robot stops cleaning and completes cleaning of the region 8#. Next, the robot cleans a region 9# from a point p9 again and by taking the Y-axis positive direction as the cleaning direction, and completes cleaning of a region 10# in sequence. Although physical boundaries p9A4 and A4A3 also exist in the two regions, the physical boundaries are not in the current cleaning direction (the Y-axis positive direction), it can only be indicated that there is no cleanable region outside the physical boundaries; thus, the robot will clean to a virtual boundary A3p10, and completes cleaning after reaching a point p10. Next, from the point p10 again, the robot sequentially completes cleaning of regions 11#, 12#, 13# and 14# by taking the X-axis positive direction as the cleaning direction. When cleaning the region 14#, the robot detects a physical boundary A1p14 in the current cleaning direction (the X-axis positive direction), which indicates that there is no cleanable region outside this boundary; and thus, when cleaning to a point p14, the robot stops cleaning and completes cleaning of the region 14#. At this time, the robot determines that, there is no uncleaned region in a direction perpendicular to the X-axis positive direction, and therefore the robot searches a point p15 having the shortest navigation distance from the p14 point, and navigates to the point p15 to start planned cleaning on a region 15#, and the cleaning direction can be the X-axis negative direction and can also be the Y-axis negative direction. As the area of the region 15# is just the size of planned cleaning region, after the cleaning, the cleaning of all the regions is completed. when the area of the region 15# is greater than the size of planned cleaning region, the cleaning of adjacent regions is performed according to the described principle of proximity; and when there are still non-adjacent uncleaned regions except the region 15#, the robot continues to clean other regions by means of map search and navigation, until all the regions are cleaned.

In some embodiments, the step S4 specifically comprises the following steps: in step S41, the robot determines the current position point as a base point, then walks forward, and starts to perform planned regional cleaning on a region on one side directly in front of the robot, and this side can be the left side of the robot or the right side of the robot, and the robot can be specifically set according to requirements; the cleaning direction is a direction towards the side directly in front of the robot, that is, when the robot cleans the left side first, the cleaning direction is from right to left, and when the robot cleans the right side first, the cleaning direction is from left to right; and after this region is cleaned, the robot proceeds to step S42; in step S42, the robot determines a current cleaning end point as a base point, and then determines whether there is at least one uncleaned region in the current cleaning direction, when there is the at least one uncleaned region in the current cleaning direction, the robot proceeds to step S43, and otherwise, the robot proceeds to step S45; in step S43, the robot selects one of the at least one uncleaned region, which is in a direction same as the current cleaning direction, and takes a region boundary of a currently-cleaned region corresponding to the base point as an adjacent side, to perform planned regional cleaning, the cleaning direction being maintained as the current cleaning direction, and then the robot proceeds to step S44; in step S44, the robot determines whether to clean to a physical boundary or a virtual boundary of the uncleaned region along the current cleaning direction, and when clean to the physical boundary or the virtual boundary, proceeding to step S45, and otherwise, the robot continues cleaning, until the robot completes planned regional cleaning of the current region, and then returns to step S42; in step S45, the robot determines a current cleaning end point as a base point, and then determines whether there is at least one uncleaned region in a direction perpendicular to the current cleaning direction, when there is the at least one uncleaned region in the direction perpendicular to the current cleaning direction, the robot proceeds to step S46, and otherwise, the robot proceeds to step S5; and in step S46, the robot selects one of the at least one uncleaned region, which is in the direction perpendicular to the current cleaning direction, faces towards a first side of a currently-cleaned region and takes a region boundary of a first side of the currently-cleaned region as an adjacent side, to perform planned regional cleaning, the cleaning direction is changed to the direction towards the first side of the currently-cleaned region, and after the planned regional cleaning, returns to step S42; and when there is no uncleaned region in the direction towards the first side of the currently-cleaned region, the robot selecting one of the at least one uncleaned region, which is in the direction perpendicular to the current cleaning direction and towards a second side of the currently-cleaned region and takes a region boundary of the second side of the currently-cleaned region as an adjacent side, to perform planned regional cleaning, the cleaning direction being changed to the direction towards the second side of the currently-cleaned region, and after cleaning, returning to step S42; and the first side of the currently-cleaned region is the of the currently-cleaned region where the base point is located, and the second side of the currently-cleaned region is the other side, opposite to the first side, of the currently-cleaned region.

These embodiments differ from the previous embodiments is that a first step (step S41) is added, that is, how to start planned cleaning, when the robot is not at a charging position. As shown in FIG. 3, from the point 0, the robot walks forward directly, and starts planned regional cleaning on a region at the right side of the robot, the cleaning direction is the X-axis positive direction, and completes planned cleaning of the region 1#. After the cleaning, the robot continues to complete cleaning of regions 2# and 3# in sequence in the current cleaning direction. The relevant cleaning method is similar to that in the previous embodiments, and will not repeated herein.

In some embodiments, the robot performing the planned regional cleaning specifically comprises the following steps: in step S61, from the base point, the robot performs planned cleaning according to a 弓-shaped trajectory form, the robot proceeds to step S62; in step S62, in the cleaning process, the robot determines in real time whether there is at least one cleaning-missed region, and the cleaning-missed region means that in regions cleaned by the robot in the cleaning direction during the planned cleaning process, a closed-loop uncleaned block which is enclosed by at least one kind of the region boundary, an obstacle boundary line and an uncleaned boundary line is contained, and the block has an uncleaned boundary line with a length greater than 1.5 times the width of the robot body, when there is the at least one cleaning-missed region during the cleaning process, the robot proceeds to step S63 for supplementary cleaning, and otherwise, continues the planned cleaning, until the planned regional cleaning is completed; and in step S63, the robot determines a current position point as a supplementary-cleaning starting point, and starts to perform supplementary cleaning on the cleaning-missed region from the supplementary-cleaning starting point, after the supplementary cleaning, the robot returns to the supplementary-cleaning starting point, and continues to perform planned cleaning on the remaining uncleaned region, and returns to step S62; and the completion of the planned regional cleaning means that when the robot cleans to a region boundary, a virtual boundary or a physical boundary along the cleaning direction, the cleaning of the whole region is completed. In these embodiments, the robot determines in real time whether there is at least one cleaning-missed region, and performs supplementary cleaning on the discovered cleaning-missed region in a timely manner, so that the robot can perform cleaning in a more orderly manner and the cleaning efficiency is higher, avoiding problems of disordered cleaning trajectory and relatively low cleaning efficiency caused by the cleaning manner of an existing robot of first performing 弓-shaped cleaning on the whole region and then performing supplementary cleaning on the cleaning-missed region.

Figure 6:
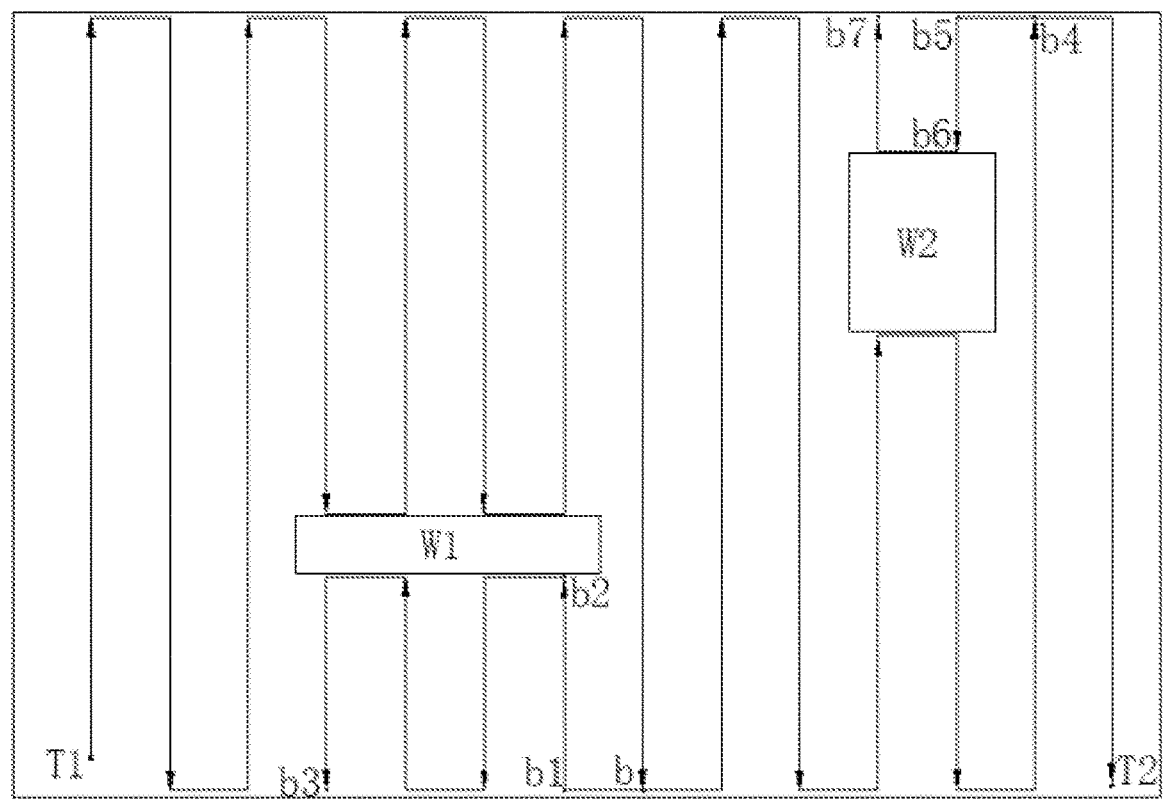
FIG. 6 is a schematic analysis diagram when the robot performs regional planned cleaning.

Specifically, as shown in FIG. 6, the outermost rectangular border in the figure is a virtual region boundary, and the region enclosed by the virtual region boundary is a grid region. When performing planned cleaning, the robot cleans such grid regions one by one. The 弓-shaped line with arrows in the grid region is a trajectory which the robot walks when performing planned regional cleaning. The small boxes labeled by W1 and W2 represent obstacles. From the position of a point T1, the robot performs 弓-shaped planned cleaning in the direction indicated by the arrows. When walking to the position of a point b, the robot determines that there is a cleaning-missed region on the right side of the robot, and thus the robot performs supplementary cleaning on the cleaning-missed region along a 弓-shaped trajectory line of b2b3 by taking the point b as a supplementary-cleaning starting point, and when walking to a point b3, the robot completes supplementary cleaning of the cleaning-missed region. Then, the robot returns to the point b, and continues to walk along the 弓-shaped trajectory line of the planned regional cleaning, so as to clean the remaining uncleaned blocks. When cleaning to a point b4, the robot determines that there is again a cleaning-missed region on the left side of the robot, and thus performs supplementary cleaning on the cleaning-missed region along a 弓-shaped trajectory line of b5b6b7 by taking the point b4 as a supplementary-cleaning starting point, and when walking to a point b7, the robot completes supplementary cleaning of the cleaning-missed region. Then, the robot returns to the point b4, continues to walk along the 弓-shaped trajectory line of the planned regional cleaning, cleans the remaining uncleaned blocks, and completes planned cleaning of the whole grid region when walking to the position of a point T2. In this way, walking from the point T1 to the point T2, the robot completes cleaning of the whole grid region, the cleaning path is quite ordered, and the cleaning efficiency is also very high. when according to the cleaning method of the existing robot, that is, walking from the position of the point T1 to the position of the point T2 according to a 弓-shaped trajectory line, then returning, from the position of the point T2, to the two cleaning-missed regions corresponding to the obstacles W1 and W2, so as to perform supplementary cleaning, thus the walking trajectories of the robot have many intersections, and the cleaning paths appear disordered, which not only decreases the cleaning efficiency, but also enables a user to observe the randomness of the robot cleaning and to consider that the robot is cleaning randomly, thereby affecting the use experience of the user.

When the robot performs supplementary cleaning, in addition to the described supplementary-cleaning path, supplementary cleaning of other methods can also be used. For example, from the point b, the robot walks straight to the point b3, and then from the point b3, the robot performs supplementary cleaning according to a 弓-shaped trajectory line of b3-b2-b1-b. Of course, the direction from top to bottom can be used as the cleaning direction, or the direction from bottom to top can be used as the cleaning direction, for supplementary cleaning. The specific supplementary-cleaning manner can be designed according to specific usage environments and product requirements.

In some embodiments, in step S61, the step of from the base point, the robot performing planned cleaning according to the 弓-shaped trajectory form comprises the following steps: in step S611, from the base point, the robot walks along the region boundary of the region, and then proceeds to step S612; in step S612, the robot determines whether at least one obstacle is detected, when the at least one obstacle is detected, the robot proceeds to step S613, otherwise, the robot continues to walk along the region boundary of the region until the robot returns to the base point, and at this time, the robot walks within the range of the region boundary to delineate an inner region, and then the robot performs planned cleaning on the delineated inner region in a 弓-shaped trajectory form; and in step S613, the robot walks along an edge at a side of the obstacle located in the range of the region, determines whether the region boundary is reached, otherwise, the robot continues to walk along the edge, and when the region boundary is reached, the robot continues to walk along the region boundary, and returns to step S612. In these present embodiments, the cleanable region of the grid region is delineated first, and then planned cleaning is performed in the delineated region, so that the robot can learn the rough shape in advance during the cleaning process, and make planning in advance. For example, when the robot is ready to reach a physical boundary, the robot can learn same by means of a map, and there is no need to determine the boundary by means of collision or other sensors; in addition, some relatively narrow entrances are learned in advance during delineation, and they will not be easily missed when performing subsequent planned cleaning.

Figure 7:
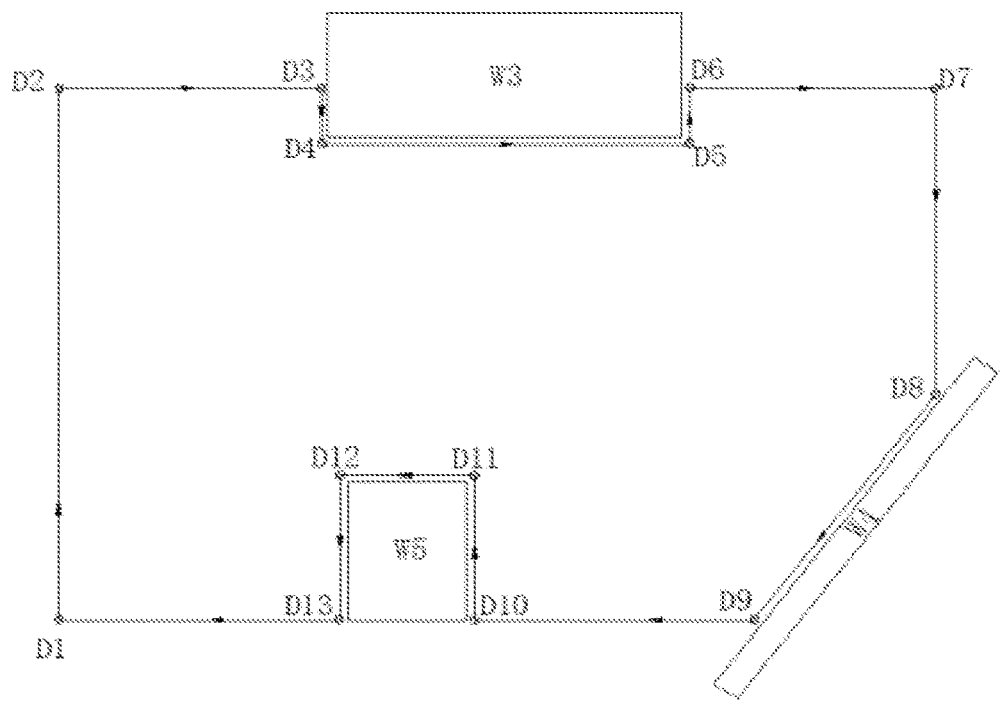
FIG. 7 is a schematic analysis diagram when the robot delineates grid regions.

Specifically, as shown in FIG. 7, W3, W4, and W5 in the figure represent obstacles. From a point D1, the robot walks along a region boundary, first walks upward towards a point D2, then turns at the point D2, and walks in a direction towards a point D3. When detecting an obstacle W3 at the point D3, the robot walks along an edge at the side of the obstacle W3 located in the range of the region, i.e. walks along a D3-D4-D5-D6 trajectory. When the robot walks along an edge to a point D6 and reaches a region boundary D2D7, the robot then continues to walk in the D6D7 direction. When reaching a region boundary D7D8 at a point D7, the robot turns and walks towards the direction of D8. When detecting an obstacle W4 at the point D8, the robot walks along the edge of the obstacle W4. At a point D9, the robot reaches a region boundary D1D9, and then walks to a point D10 in a direction of D9D10. At this time, the robot detects an obstacle W5, and walks along an edge at the side of the obstacle W5 in the range of the region, that is, walks along a trajectory of D10-D11-D12-D13, reaches a point D13, and then continues to walk along a direction of D13D1, and walks to the point D1. Finally, the robot walks within the boundary range of this region and delineates an inner region enclosed by D1-D2-D3-D4-D5-D6-D7-D8-D9-D10-D11-D12-D13-D1. The robot then performs planned cleaning on the delineated inner region in a 弓-shaped trajectory form. The robot delineates a range first, facilitating subsequent planned cleaning, which not only enables the robot to learn the positions of obstacles in advance during planned cleaning so as to reduce collisions, but also can acquire position information of some narrow entrances in advance, thereby further avoiding situations of missing cleaning.

In some embodiments, in step S62, the step of in the cleaning process, the robot determining in real time whether there is the at least one cleaning-missed region specifically comprises the following steps: in step S621; the robot determines whether there is at least one closed-loop uncleaned block in the range through which the robot walks along the cleaning direction, when there is the at least one closed-loop uncleaned block, the robot proceeds to step S622, and otherwise, the robot continues cleaning; and in step S622, the robot determines whether there is, in the uncleaned block, at least one uncleaned boundary line having a length greater than a preset distance, the preset distance can be set according to specific product design requirements, and can generally be set as 1.5 to 2 times the width of the robot body, when there is the at least one uncleaned boundary line, it indicates that the robot can enter the block from the uncleaned boundary line to perform cleaning, and therefore it can be determined that there is a cleaning-missed region, otherwise, it indicates that the block cannot be cleaned, and thus it is determined that there is no cleaning-missed region, and the closed-loop uncleaned block refers to an uncleaned region enclosed by at least one kind of a region boundary, an obstacle boundary line and an uncleaned boundary line. By means of the method in the present embodiments, it can be accurately determined in real time whether there is a cleaning-missed region, thereby effectively avoiding the situation of the robot missing cleaning, and improving the cleaning quality of the robot.

Figure 8:
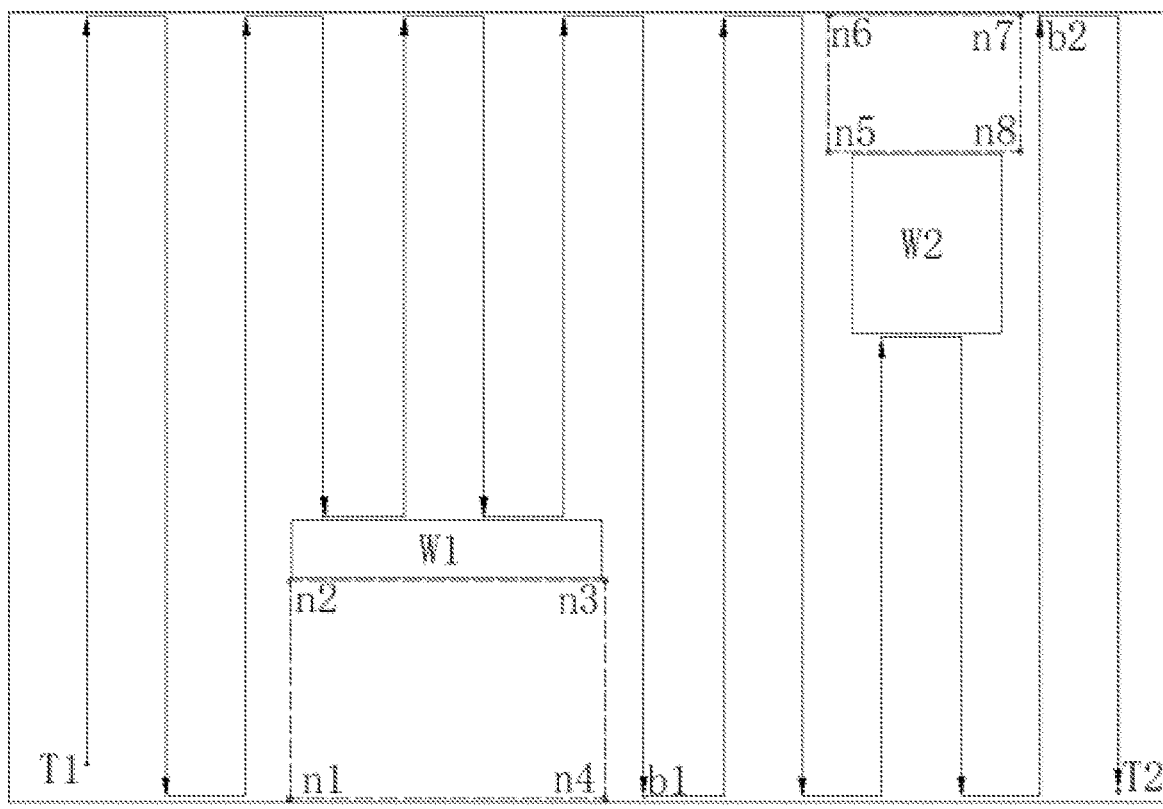
FIG. 8 is a schematic analysis diagram of the robot determining whether there is a cleaning-missed region.

As shown in FIG. 8, this figure is similar to FIG. 6, and the main difference is that: in FIG. 8, cleaning-missed regions are marked by means of dotted boxes. First, the robot walks from a point T1, and performs 弓-shaped planned cleaning in this region. When walking to a point b1, the robot determines that there is; a closed-loop uncleaned block n1n2n3n4 on the right side of the robot, and the block is enclosed by a region boundary n1n4, an obstacle boundary line n2n3, and uncleaned boundary lines n1n2 and n3n4 together. And the uncleaned boundary lines n1n2 and n3n4 are both relatively long, greater than 2 times the width of the robot body, so the robot can enter the block from the two boundary entrances for cleaning. Optimally, the robot walks directly from the point b1 to a point n4, and then performs planned cleaning on the block from the point n4 by taking a direction from right to left as the cleaning direction. After cleaning, the robot returns to the point b1 again, and continues the original planned regional cleaning. When cleaning to a point b2, the robot determines that there is a closed-loop uncleaned block n5n6n7n8 on the left side of the robot, and the block is enclosed by a region boundary n6n7, an obstacle boundary line n5n8, and uncleaned boundary lines n5n6 and n7n8 together. And the uncleaned boundary lines n5n6 and n7n8 are both relatively long, greater than 1.5 times the width of the robot body, so the robot can enter the block from the two boundary entrances for cleaning. Optimally, the robot walks directly from the point b2 to a point n7, and then performs planned cleaning on the block from the point n7 by taking a direction from right to left as the cleaning direction. After cleaning, the robot returns to the point b2 again, and continues the original planned regional cleaning until the robot walks to a point T2 and completes planned cleaning of the whole region.

In some embodiments, in step S63, the step of the robot determining the current position point as the supplementary-cleaning starting point and starting to perform supplementary cleaning on the cleaning-missed region from the supplementary-cleaning starting point comprises the following steps: in step S631, the robot determines the current position point as the supplementary-cleaning starting point and searches a map constructed in a walking process, and then the robot proceeds to step S632; in step S632, the robot selects a supplementary-cleaning entrance, in the cleaning-missed region, having the shortest navigation distance from the supplementary-cleaning starting point, selects, as a first supplementary-cleaning point, an endpoint position having a shorter distance from the supplementary-cleaning starting point in two endpoint positions of the shortest supplementary-cleaning entrance, and selects another endpoint position in the shortest supplementary-cleaning entrance as a second supplementary-cleaning point, and then the robot proceeds to step S633; and in step S633, the robot navigates to the first supplementary-cleaning point, starts to walk and clean towards the second supplementary-cleaning point, and performs 弓-shaped planned cleaning on the cleaning-missed region by taking, as the current cleaning direction, a direction towards the interior of the cleaning-missed region sand parallel to the cleaning direction of the planned regional cleaning, until the robot completes the cleaning of the cleaning-missed region, and then the supplementary cleaning ends. By means of the supplementary-cleaning method of the present embodiments, the robot can perform supplementary cleaning on nearby regions, and thus the supplementary cleaning efficiency and the supplementary cleaning quality are higher, avoiding the problems of disordered cleaning paths and lower cleaning efficiency caused by other supplementary-cleaning methods.

Figure 9:
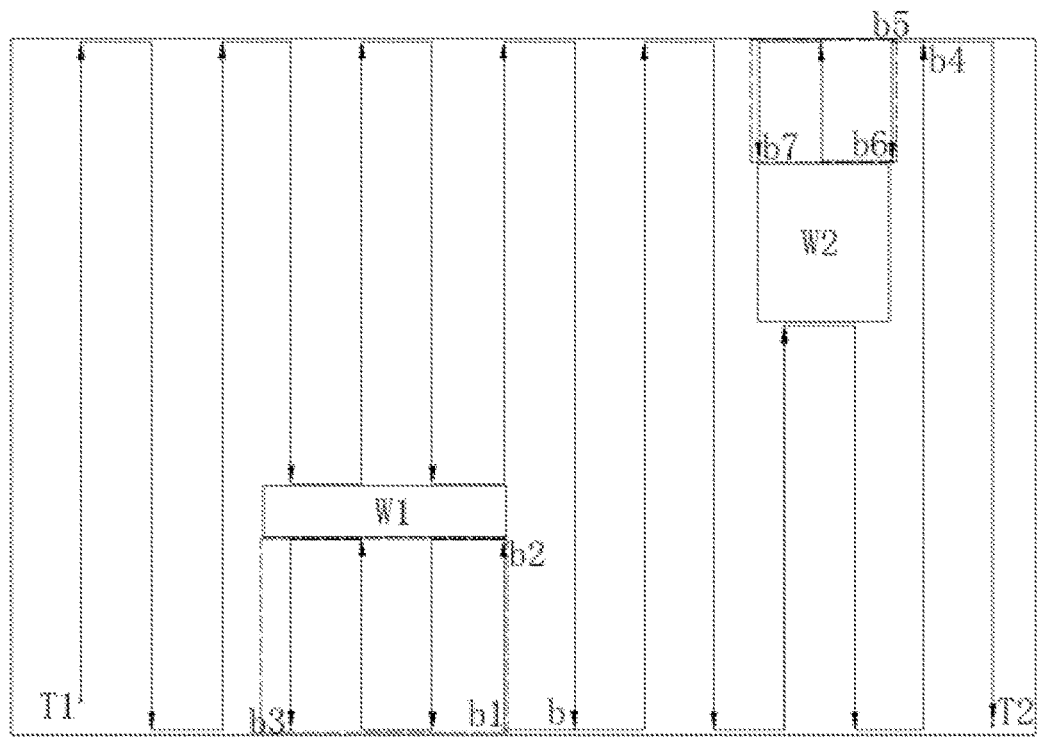
FIG. 9 is a schematic analysis diagram of the robot performing supplementary cleaning.

Specifically, as shown in FIG. 9, the outermost rectangular border in the figure is a virtual region boundary, and the region enclosed by the virtual region boundary is a grid region. The 弓-shaped line with arrows in the grid region is a trajectory which the robot walks when performing planned regional cleaning. The small boxes labeled by W1 and W2 represent obstacles. From the position of a point T1, the robot performs 弓-shaped planned cleaning in the direction indicated by the arrows. When walking to the position of a point b, the robot determines that there is a cleaning-missed region (the region marked by a dotted box at the lower part of the figure) on the right side of the robot, and it can be determined from searching the map that the region has two supplementary-cleaning entrances, one is an entrance corresponding to a dotted line on the left side of the dotted box, and the other is an entrance corresponding to a dotted line on the right side of the dotted box, and the entrance on the right side is shorter from the current position of the robot. From the positions of two endpoints b1 and b2 at the right entrance, the robot selects the point b1 shorter from the current position as a first supplementary-cleaning point, then walks to the point b1 and walks towards the point b2, and starts to perform the 弓-shaped planned cleaning on the cleaning-missed region, the cleaning direction is from right to deft. After completing cleaning along the trajectory of b1-b2-b3, the robot directly returns to the point b to continue planned cleaning on the remaining regions. Likewise, when walking to the position of a point b4, the robot determines that there is a cleaning-missed region (the region marked by a dotted box at the upper part of the figure) on the left side of the robot, and it can be determined from searching the map that the region has two supplementary-cleaning entrances, one is an entrance corresponding to a dotted line on the left side of the dotted box, and the other is an entrance corresponding to a dotted line on the right side of the dotted box, and the entrance on the right side is shorter from the current position of the robot. From the positions of two endpoints, b5 and b6 at the right entrance, the robot selects the point b5 shorter from the current position as a first supplementary-cleaning point, then walks to the point b5 and walks towards the point b6, and starts to perform the 弓-shaped planned cleaning on the cleaning-missed region, the cleaning direction is from right to left, After completing cleaning along the trajectory of b5-b6-b7, the robot directly returns to the point b4 to continue planned cleaning on the remaining regions. It can be determined obviously from the figure that when the robot performs supplementary cleaning in this manner, there are no crossed and disordered trajectory lines, and the supplementary-cleaning quality and effect are better, making a user feel that the cleaning is very organized, having very good user experience.

A chip, for storing program instructions, wherein the program instructions are used for controlling a robot to execute the method for controlling cleaning as described in the described embodiments. By configuring the program instructions for the chip, when the robot is located at the position of a charging base, the robot is controlled to clean a preset region around the charging base first, and then a cleaning restricted zone is formed, such that the robot will not enter the restricted zone in the subsequent cleaning process, preventing the robot from bumping into the charging base accidentally, thereby changing the position of the charging base; in addition, by controlling the robot to perform planned regional cleaning according to the principle of proximity, the cleaning efficiency and orderliness of the robot can be improved.

A robot cleaner, which can be a floor cleaning robot or a floor mopping robot, wherein a main control chip is assembled in the robot, and the main control chip is the chip as described in the described embodiments. By assembling the chip on a robot, when the robot is located at the position of a charging base, the robot is controlled to clean a preset region around the charging base first, and then a cleaning restricted zone is formed, such that the robot will not enter the restricted zone in the subsequent cleaning process, preventing the robot from bumping into the charging base accidentally, thereby changing the position of the charging base; in addition, by controlling the robot to perform planned regional cleaning according to the principle of proximity, the cleaning efficiency and orderliness of the robot can be improved.

It should be noted that in the described embodiments, the maximum range cleaned by the robot is defined by virtual boundaries preset in a system, and when the robot cleans to an outermost virtual boundary, the robot does not continue to expand outward to, perform cleaning. For example, in FIG. 2, the four outermost long edges are virtual boundaries, and a region enclosed by the four virtual boundaries is divided into 15 grid regions. The grid region is defined by virtual region boundaries, and as long as the virtual region boundaries are not located on the outermost virtual boundaries, the robot can cross the virtual region boundaries when cleaning each grid region. A virtual region boundary p8p9 shown in FIG. 2 is on a virtual boundary, and thus after cleaning to the p8p9 line of the region 8#, the robot considers that there is no cleanable region at regions outside the left side of the p8p9 line. when there are physical boundaries within a range defined by virtual boundaries, the range cleaned by the robot will be defined within a region that is continuously enclosed by the virtual boundaries and the physical boundaries, or within a region that is completely enclosed by physical boundaries (if the range enclosed by physical boundaries is completely within a range enclosed by virtual boundaries). As shown in FIG. 5, the range cleaned by the robot is a region defined by A3-A5-p8-p4-A2-A1-p10-A3, wherein A3-A5 is a physical boundary, A5-p8-p4-A2 is a virtual boundary, A2-A1 is a physical boundary, and A1-A3 is a virtual boundary. When walking to virtual boundaries and physical boundaries, the robot will consider that there is no cleanable region on outer sides corresponding to the boundaries. The physical boundary refers to a boundary line marked corresponding to a map on the basis of the positions of detected obstacles when the robot detects obstacles, and the boundary line can indicate that there is no cleanable region in regions outside the region corresponding to the boundary line. The uncleaned boundary line refers to a boundary line between a cleaned region and an uncleaned region.

The directional terms such as "upper", "lower", "left" and "right" mentioned in the described embodiments refer to directions such as upper, lower, left and right in the drawings unless otherwise specified. when there are specific illustrations, the terms are defined according to the specific illustrations, for example, the left side of the robot refers to the left side in the advancing direction of the robot, instead of referring to the left side in the figures.

The direct front direction of the charging base mentioned in the described embodiments refers to a direction to which the side of the charging base connected to the robot faces, and an infrared sensor for guiding the robot to return to the base is provided on the side. One side at the direct front direction of the charging base can be a left side of the charging base, and can also be a right side of the charging base, which can be specifically set according to product design requirements. when one side at the direct front direction of the charging base is set as a left side, the other side is the right side of the charging base; and when one side at the direct front direction of the charging base is set as a right side, the other side is the left side of the charging base.

A person of ordinary skill in the art would have understood that all or some of the steps for implementing the described method embodiments can be implemented by programs instructing relevant hardware. These programs can be stored on a computer readable storage medium (media which can store program codes, such as ROM, RAM, magnetic disk, or optical disk). When being executed, the programs execute the steps included in the described method embodiments. Finally, it should be noted that the described embodiments are only used to explain the technical solutions in some embodiments of the present disclosure, rather than limit same. Although some embodiments of the present disclosure have been explained in detail with reference to the described embodiments, a person of ordinary skill in the art would have understood that they still could modify the technical solutions disclosed in the described embodiments or make equivalent replacements to some or all of the technical features therein. However, these modifications or replacements shall not render that the nature of the corresponding technical solutions departs from the scope of the technical solutions in the embodiments of the present disclosure.

What is claimed is:

1. A method for controlling cleaning of a robot, comprising:
    step S1: receiving, by the robot, a control instruction for starting cleaning, and determining whether the robot is currently located at a position of a charging base, when the robot is currently located at the position of the charging base, proceeding to step S2, and when the robot is not currently located at the position of the charging base, proceeding to step S4;
    step S2: leaving, by the robot, the charging base, and performing planned cleaning in a preset range with the charging base as a base point, and after cleaning, proceeding to step S3;
    step S3: performing cleaning, by the robot, with a current cleaning end point as a base point in a region outside the preset range according to a principle of proximity, and when an uncleaned region cannot be determined according to the principle of proximity, proceeding to step S5;
    step S4: starting to perform, by the robot, planned regional cleaning with a current position point as a base point, and performing the planned regional cleaning in other regions according to the principle of proximity, and when the uncleaned region cannot be determined according to the principle of proximity, proceeding to step S5; and
    step S5: selecting a position point in the uncleaned region having the shortest navigation distance from the current cleaning end point as the base point, then performing the planned regional cleaning in the uncleaned region according to the principle of proximity, and in a process of cleaning, when the uncleaned region cannot be determined according to the principle of proximity, selecting a position point in the uncleaned region having the shortest navigation distance from the current cleaning end point as the base point, continuing to perform the planned regional cleaning in the uncleaned region according to the principle of proximity, until all regions are cleaned;
    wherein the principle of proximity is used to determine the uncleaned region in the following order:
    1) the robot selects the uncleaned region, which is in a direction same as a current cleaning direction and takes a region boundary of a cleaned region corresponding to the base point as an adjacent side;
    2) the robot selects the uncleaned region, which is in a direction perpendicular to the current cleaning direction and takes a region boundary of the cleaned region corresponding to the base point as an adjacent side;
    3) the robot selects the uncleaned region, which is in a direction perpendicular to the current cleaning direction and takes another region boundary opposite to the region boundary of the cleaned region corresponding to the base point as an adjacent side;
    wherein the planned regional cleaning refers to a manner in which the robot cleans a region with a preset length and a preset width according to a predetermined trajectory form; and
    wherein the cleaning direction refers to a direction in which a cleaning range extends from one end to the other end of a region when the robot performs the planned regional cleaning.

2. The method according to claim 1, wherein in step S2, performing the planned cleaning in the preset range with the charging base as the base point comprises:
    walking forward, by the robot, in a direction directly in front of the charging base, starting to perform 弓-shaped planned cleaning on a first region at one side directly in front of the charging base, after cleaning, then returning to a direct front direction of the charging base along a region boundary of the first region, and then performing 弓-shaped planned cleaning on a second region at the other side directly in front of the charging base;
    wherein the first region and the second region have the same length, the first region and the second region have the same width, a sum of a length of the first region and a length of the second region is equal to a length of the preset range, and a width of the first region or a width of the second region is equal to a width of the preset range.

3. The method according to claim 2, wherein the step S3 comprises:
    step S31: determining, by the robot, the current cleaning end point as the base point, and then determining whether there is at least one uncleaned region in the current cleaning direction, when there is the at least one uncleaned region in the current cleaning direction, proceeding to step S32, and otherwise, proceeding to step S34;
    step S32, selecting, by the robot, one of the at least one uncleaned region, which is in a direction same as the current cleaning direction and takes a region boundary of a currently-cleaned region corresponding to the base point as an adjacent side, to perform the planned regional cleaning, the cleaning direction being maintained as the current cleaning direction, and then proceeding to step S33;
    step S33: determining, by the robot, whether to clean to a physical boundary or a virtual boundary of the uncleaned region along the current cleaning direction, and when clean to the physical boundary or the virtual boundary, proceeding to step S34, and otherwise, continuing cleaning by the robot, until the robot completes the planned regional cleaning of the current region, and then returning to step S31;

step S34, determining, by the robot, a current cleaning end point as a base point, and then determining whether there is at least one uncleaned region in a direction perpendicular to the current cleaning direction, when there is the at least one uncleaned region in the direction perpendicular to the current cleaning direction, proceeding to step S35, and otherwise, proceeding to step S5; and step S35: selecting, by the robot, one of the at least one uncleaned region, which is in the direction perpendicular to the current cleaning direction and towards a first side of a currently-cleaned region and takes a region boundary of the first side of the currently-cleaned region as an adjacent side, to perform planned regional cleaning, the cleaning direction being changed to a direction towards the first side of the currently-cleaned region, and after cleaning, returning to step S31; and when there is no uncleaned region in the direction towards the first side of the currently-cleaned region, selecting, by the robot, an uncleaned region, which is in a direction perpendicular to the current cleaning direction and towards a second side of the currently-cleaned region and takes a region boundary of the second side of the currently-cleaned region as an adjacent side, to perform planned regional cleaning, the cleaning direction being changed to a direction towards the second side of the currently-cleaned region, and after cleaning, returning to step S31; wherein the first side of the currently-cleaned region is a side of the currently-cleaned region where the base point is located, and the second side of the currently-cleaned region is the other side, opposite to the first side, of the currently-cleaned region.

4. The method according to claim 3, wherein performing the planned regional cleaning by the robot comprises:

step S61: from the base point, performing, by the robot, the planned cleaning in a 弓-shaped trajectory form, proceeding to step S62;

step S62: determining, by the robot, in real time whether there is at least one cleaning-missed region during a cleaning process, when there is the at least one cleaning-missed region during the cleaning process, proceeding to step S63, and otherwise, continuing the planned cleaning, until the planned regional cleaning is completed; and step S63: determining, by the robot, a current position point as a supplementary-cleaning starting point, and starting to perform supplementary cleaning on the at least one cleaning-missed region from the supplementary-cleaning starting point, after the supplementary cleaning, returning, by the robot, to the supplementary-cleaning starting point, continuing to perform planned cleaning on a remaining uncleaned region, and returning to step S62;

wherein completion of the planned regional cleaning means that when the robot cleans to a region boundary, a virtual boundary or a physical boundary along the cleaning direction, the cleaning of the region is completed.

5. The method according to claim 4, wherein from the base point, performing, by the robot, planned cleaning in the 弓-shaped trajectory form comprises:

step S611: from the base point, walking, by the robot, along a region boundary of the region, and then proceeding to step S612;

step S612: determining, by the robot, whether at least one obstacle is detected, when the at least one obstacle is detected, proceeding to step S613, otherwise, continuing to walk along the region boundary of the region until the robot returns to the base point, and at this time, the robot walking within the range of the region boundary to delineate an inner region, and then performing the planned cleaning, by the robot, in the inner region which is delineated in the 弓-shaped trajectory form; and step S613: walking, by the robot, along an edge at a side of the obstacle located in the range of the region, determining whether the region boundary is reached, otherwise, continuing to walk along the edge, and when the region boundary is reached, continuing to walk along the region boundary, and returning to step S612.

6. The method according to claim 2, wherein performing the planned regional cleaning by the robot comprises:

step S61: from the base point, performing, by the robot, the planned cleaning in a 弓-shaped trajectory form, proceeding to step S62;

step S62: determining, by the robot, in real time whether there is at least one cleaning-missed region during a cleaning process, when there is the at least one cleaning-missed region during the cleaning process, proceeding to step S63, and otherwise, continuing the planned cleaning, until the planned regional cleaning is completed; and step S63: determining, by the robot, a current position point as a supplementary-cleaning starting point, and starting to perform supplementary cleaning on the at least one cleaning-missed region from the supplementary-cleaning starting point, after the supplementary cleaning, returning, by the robot, to the supplementary-cleaning starting point, continuing to perform planned cleaning on a remaining uncleaned region, and returning to step S62;

wherein completion of the planned regional cleaning means that when the robot cleans to a region boundary, a virtual boundary or a physical boundary along the cleaning direction, the cleaning of the region is completed.

7. The method according to claim 6, wherein from the base point, performing, by the robot, planned cleaning in the 弓-shaped trajectory form comprises:

step S611: from the base point, walking, by the robot, along a region boundary of the region, and then proceeding to step S612;

step S612:determining, by the robot, whether at least one obstacle is detected, when the at least one obstacle is detected, proceeding to step S613, otherwise, continuing to walk along the region boundary of the region until the robot returns to the base point, and at this time, the robot walking within the range of the region boundary to delineate an inner region, and then performing the planned cleaning, by the robot, in the inner region which is delineated in the 弓-shaped trajectory form; and step S613: walking, by the robot, along an edge at a side of the obstacle located in the range of the region, determining whether the region boundary is reached, otherwise, continuing to walk along the edge, and when the region boundary is reached, continuing to walk along the region boundary, and returning to step S612.

8. The chip according to claim 6, wherein the step S3 comprises:
- step S31: determining, by the robot, the current cleaning end point as the base point, and then determining whether there is at least one uncleaned region in the current cleaning direction, when there is the at least one uncleaned region in the current cleaning direction, proceeding to step S32, and otherwise, proceeding to step S34;
- step S32, selecting, by the robot, one of the at least one uncleaned region, which is in a direction same as the current cleaning direction and takes a region boundary of a currently-cleaned region corresponding to the base point as an adjacent side, to perform the planned regional cleaning, the cleaning direction being maintained as the current cleaning direction, and then proceeding to step S33;
- step S33: determining, by the robot, whether to clean to a physical boundary or a virtual boundary of the uncleaned region along the current cleaning direction, and when clean to the physical boundary or the virtual boundary, proceeding to step S34, and otherwise, continuing cleaning by the robot, until the robot completes the planned regional cleaning of the current region, and then returning to step S31;
- step S34, determining, by the robot, a current cleaning end point as a base point, and then determining whether there is at least one uncleaned region in a direction perpendicular to the current cleaning direction, when there is the at least one uncleaned region in the direction perpendicular to the current cleaning direction, proceeding to step S35, and otherwise, proceeding to step S5; and
- step S35: selecting, by the robot, one of the at least one uncleaned region, which is in the direction perpendicular to the current cleaning direction and towards a first side of a currently-cleaned region and takes a region boundary of the first side of the currently-cleaned region as an adjacent side, to perform planned regional cleaning, the cleaning direction being changed to a direction towards the first side of the currently-cleaned region, and after cleaning, returning to step S31; and when there is no uncleaned region in the direction towards the first side of the currently-cleaned region, selecting, by the robot, an uncleaned region, which is in a direction perpendicular to the current cleaning direction and towards a second side of the currently-cleaned region and takes a region boundary of the second side of the currently-cleaned region as an adjacent side, to perform planned regional cleaning, the cleaning direction being changed to a direction towards the second side of the currently-cleaned region, and after cleaning, returning to step S31; wherein the first side of the currently-cleaned region is a side of the currently-cleaned region where the base point is located, and the second side of the currently-cleaned region is the other side, opposite to the first side, of the currently-cleaned region.

9. The method according to claim 1, wherein step S4 comprises:
- step S41: determining, by the robot, the current position point as a base point, then walking forward, and starting to perform the planned regional cleaning on a region on one side directly in front of the robot, the cleaning direction being a direction towards the side directly in front of the robot, and after cleaning, proceeding to step S42;
- step S42: taking, by the robot, a current cleaning end point as a base point, and then determining whether there is at least one uncleaned region in a current cleaning direction, when there is the at least one uncleaned region in the current cleaning direction, proceeding to step S43, and otherwise, proceeding to step S45;
- step S43, selecting, by the robot, one of the at least one uncleaned region, which is in a direction same as the current cleaning direction and takes a region boundary of a currently-cleaned region corresponding to the base point as an adjacent side, to perform planned regional cleaning, the cleaning direction being maintained as the current cleaning direction, and then proceeding to step S44;
- step S44: determining, by the robot, whether to clean to a physical boundary or a virtual boundary of the uncleaned region along the current cleaning direction, when clean to the physical boundary or the virtual boundary, proceeding to step S45, and otherwise, continuing cleaning by the robot, until the robot completes the planned regional cleaning of the current region, and then returning to step S42;
- step S45: determining, by the robot, a current cleaning end point as a base point, and then determining whether there is at least one uncleaned region in a direction perpendicular to the current cleaning direction, when there is the at least one uncleaned region in the direction perpendicular to the current cleaning direction, proceeding to step S46, and otherwise, proceeding to step S5; and
- step S46: selecting, by the robot, one of the at least one uncleaned region, which is in the direction perpendicular to the current cleaning direction and towards a first side of a currently-cleaned region and takes a region boundary of the first side of the currently-cleaned region as an adjacent side, to perform planned regional cleaning, the cleaning direction being changed to a direction towards the first side of the currently-cleaned region, and after the planned regional cleaning, returning to step S42; and when there is no uncleaned region in the direction towards the first side of the currently-cleaned region, selecting, by the robot, one of the at least one uncleaned region, which is in the direction perpendicular to the current cleaning direction and towards a second side of the currently-cleaned region and takes a region boundary of the second side of the currently-cleaned region as an adjacent side, to perform planned regional cleaning, the cleaning direction being changed to the direction towards the second side of the currently-cleaned region, and after cleaning, returning to step S42; wherein the first side of the currently-cleaned region is a side of the currently-cleaned region where the base point is located, and the second side of the currently-cleaned region is the other side, opposite to the first side, of the currently-cleaned region.

10. The method according to claim 9, wherein performing the planned regional cleaning by the robot comprises:
- step S61: from the base point, performing, by the robot, the planned cleaning in a 弓-shaped trajectory form, proceeding to step S62;
- step S62: determining, by the robot, in real time whether there is at least one cleaning-missed region during a cleaning process, when there is the at least one cleaning-missed region during the cleaning process, proceeding to step S63, and otherwise, continuing the planned cleaning, until the planned regional cleaning is completed; and step S63: determining, by the robot, a current position point as a supplementary-cleaning starting point, and starting to perform supplementary cleaning on the at least one cleaning-missed region from the supplementary-cleaning starting point, after the supplementary cleaning, returning, by the robot, to the supplementary-cleaning starting point, continuing to perform planned cleaning on a remaining uncleaned region, and returning to step S62;

wherein completion of the planned regional cleaning means that when the robot cleans to a region boundary, a virtual boundary or a physical boundary along the cleaning direction, the cleaning of the region is completed.

11. The method according to claim 10, wherein from the base point, performing, by the robot, planned cleaning in the 弓-shaped trajectory form comprises:

step S611: from the base point, walking, by the robot, along a region boundary of the region, and then proceeding to step S612;

step S612:determining, by the robot, whether at least one obstacle is detected, when the at least one obstacle is detected, proceeding to step S613, otherwise, continuing to walk along the region boundary of the region until the robot returns to the base point, and at this time, the robot walking within the range of the region boundary to delineate an inner region, and then performing the planned cleaning, by the robot, in the inner region which is delineated in the 弓-shaped trajectory form; and step S613: walking, by the robot, along an edge at a side of the obstacle located in the range of the region, determining whether the region boundary is reached, otherwise, continuing to walk along the edge, and when the region boundary is reached, continuing to walk along the region boundary, and returning to step S612.

12. The method according to claim 1, wherein performing the planned regional cleaning by the robot comprises:

step S61: from the base point, performing, by the robot, the planned cleaning in a 弓-shaped trajectory form, proceeding to step S62;

step S62: determining, by the robot, in real time whether there is at least one cleaning-missed region during a cleaning process, when there is the at least one cleaning-missed region during the cleaning process, proceeding to step S63, and otherwise, continuing the planned cleaning, until the planned regional cleaning is completed; and step S63: determining, by the robot, a current position point as a supplementary-cleaning starting point, and starting to perform supplementary cleaning on the at least one cleaning-missed region from the supplementary-cleaning starting point, after the supplementary cleaning, returning, by the robot, to the supplementary-cleaning starting point, continuing to perform planned cleaning on a remaining uncleaned region, and returning to step S62;

wherein completion of the planned regional cleaning means that when the robot cleans to a region boundary, a virtual boundary or a physical boundary along the cleaning direction, the cleaning of the region is completed.

13. The method according to claim 12, wherein from the base point, performing, by the robot, planned cleaning in the 弓-shaped trajectory form comprises:

step S611: from the base point, walking, by the robot, along a region boundary of the region, and then proceeding to step S612;

step S612: determining, by the robot, whether at least one obstacle is detected, when the at least one obstacle is detected, proceeding to step S613, otherwise, continuing to walk along the region boundary of the region until the robot returns to the base point, and at this time, the robot walking within the range of the region boundary to delineate an inner region, and then performing the planned cleaning, by the robot, in the inner region which is delineated in the 弓-shaped trajectory form; and step S613: walking, by the robot, along an edge at a side of the obstacle located in the range of the region, determining whether the region boundary is reached, otherwise, continuing to walk along the edge, and when the region boundary is reached, continuing to walk along the region boundary, and returning to step S612.

14. The method according to claim 12, wherein determining, by the robot, in real time whether there is the at least one cleaning-missed region during the cleaning process comprises:

step S621: determining, by the robot, whether there is at least one closed-loop uncleaned block in a range through which the robot walks along the cleaning direction, when there is the at least one closed-loop uncleaned block, proceeding to step S622, and otherwise, continuing cleaning; and step S622: determining, by the robot, whether there is, in the closed-loop uncleaned block, at least one uncleaned boundary line having a length greater than a preset distance, and when there is the at least one uncleaned boundary line, determining that there is the at least one cleaning-missed region, and otherwise, determining that there is no cleaning-missed region;

wherein the closed-loop uncleaned block refers to an uncleaned region enclosed by at least one kind of the region boundary, an obstacle boundary line and the uncleaned boundary line.

15. The method according to claim 12, wherein determining, by the robot, the current position point as the supplementary-cleaning starting point, and starting to perform supplementary cleaning on the cleaning-missed region from the supplementary-cleaning starting point comprises:

step S631: determining, by the robot, the current position point as the supplementary-cleaning starting point and searching a map constructed in a walking process, and then proceeding to step S632;

step S632: selecting, by the robot, a supplementary-cleaning entrance, in the cleaning-missed region, having the shortest navigation distance from the supplementary-cleaning starting point, selecting, as a first supplementary-cleaning point, an endpoint position having a shorter distance from the supplementary-cleaning starting point in two endpoint positions of the shortest supplementary-cleaning entrance, and selecting another endpoint position in the shortest supplementary-cleaning entrance as a second supplementary-cleaning point, and then proceeding to step S633; and step S633: navigating, by the robot, to the first supplementary-cleaning point, starting to walk and clean towards the second supplementary-cleaning point, and performing 弓-shaped planned cleaning on the cleaning-missed region by taking, as the current cleaning direction, a direction towards interior of the cleaning-missed region and parallel to the cleaning direction of the planned regional cleaning, until the robot completes the cleaning of the cleaning-missed region, and then the supplementary cleaning ending.

16. A chip, for storing program instructions, wherein the program instructions are used for controlling a robot to execute a method for controlling cleaning, the method for controlling cleaning of the robot comprises:

step S1: receiving, by the robot, a control instruction for starting cleaning, and determining whether the robot is currently located at a position of a charging base, when the robot is currently located at the position of the charging base, proceeding to step S2, and when the robot is not currently located at the position of the charging base, proceeding to step S4;

step S2: leaving, by the robot, the charging base, and performing planned cleaning in a preset range with the charging base as a base point, and after cleaning, proceeding to step S3;

step S3: performing cleaning, by the robot, with a current cleaning end point as a base point in a region outside the preset range according to a principle of proximity, and when an uncleaned region cannot be determined according to the principle of proximity, proceeding to step S5;

step S4: starting to perform, by the robot, planned regional cleaning with a current position point as a base point, and performing the planned regional cleaning in other regions according to the principle of proximity, and when the uncleaned region cannot be determined according to the principle of proximity, proceeding to step S5; and step S5: selecting a position point in the uncleaned region having the shortest navigation distance from the current cleaning end point as the base point, then performing the planned regional cleaning in the uncleaned region according to the principle of proximity, and in a process of cleaning, when the uncleaned region cannot be determined according to the principle of proximity, selecting a position point in the uncleaned region having the shortest navigation distance from the current cleaning end point as the base point, continuing to perform the planned regional cleaning in the uncleaned region according to the principle of proximity, until all regions are cleaned;

wherein the principle of proximity is used to determine the uncleaned region in the following order:
1) The robot selects the uncleaned region, which is in a direction same as a current cleaning direction and takes a region boundary of a cleaned region corresponding to the base point as an adjacent side;
2) then the robot selects the uncleaned region, which is in a direction perpendicular to the current cleaning direction and takes a region boundary of the cleaned region corresponding to the base point as an adjacent side;
3) the robot selects the uncleaned region, which is in a direction perpendicular to the current cleaning direction and takes another region boundary opposite to the region boundary of the cleaned region corresponding to the base point as an adjacent side, to perform the planned regional cleaning;

wherein the planned regional cleaning refers to a manner in which the robot cleans a region with a preset length and a preset width according to a predetermined trajectory form; and wherein the cleaning direction refers to a direction in which a cleaning range extends from one end to the other end of a region when the robot performs the planned regional cleaning.

17. A robot cleaner, comprising a main control chip, wherein the main control chip is the chip according to claim 16.

18. The chip according to claim 17, wherein in step S2, performing the planned cleaning in the preset range with the charging base as the base point comprises:

walking forward, by the robot, in a direction directly in front of the charging base, starting to perform 弓-shaped planned cleaning on a first region at one side directly in front of the charging base, after cleaning, then returning to a direct front direction of the charging base along a region boundary of the first region, and then performing 弓-shaped planned cleaning on a second region at the other side directly in front of the charging base;

wherein the first region and the second region have the same length, the first region and the second region have the same width, a sum of a length of the first region and a length of the second region is equal to a length of the preset range, and a width of the first region or a width of the second region is equal to a width of the preset range.

19. The chip according to claim 17, wherein step S4 comprises:

step S41: determining, by the robot, the current position point as a base point, then walking forward, and starting to perform the planned regional cleaning on a region on one side directly in front of the robot, the cleaning direction being a direction towards the side directly in front of the robot, and after cleaning, proceeding to step S42;

step S42: taking, by the robot, a current cleaning end point as a base point, and then determining whether there is at least one uncleaned region in a current cleaning direction, when there is the at least one uncleaned region in the current cleaning direction, proceeding to step S43, and otherwise, proceeding to step S45;

step S43, selecting, by the robot, one of the at least one uncleaned region, which is in a direction same as the current cleaning direction and takes a region boundary of a currently-cleaned region corresponding to the base point as an adjacent side, to perform planned regional cleaning, the cleaning direction being maintained as the current cleaning direction, and then proceeding to step S44;

step S44: determining, by the robot, whether to clean to a physical boundary or a virtual boundary of the uncleaned region along the current cleaning direction, when clean to the physical boundary or the virtual boundary, proceeding to step S45, and otherwise, continuing cleaning by the robot, until the robot completes the planned regional cleaning of the current region, and then returning to step S42;

step S45: determining, by the robot, a current cleaning end point as a base point, and then determining whether there is at least one uncleaned region in a direction perpendicular to the current cleaning direction, when there is the at least one uncleaned region in the direction perpendicular to the current cleaning direction, proceeding to step S46, and otherwise, proceeding to step S5; and step S46: selecting, by the robot, one of the at least one uncleaned region, which is in the direction perpendicular to the current cleaning direction and towards a first side of a currently-cleaned region and takes a region boundary of the first side of the currently-cleaned region as an adjacent side, to perform planned regional cleaning, the cleaning direction being changed to a direction towards the first side of the currently-cleaned region, and after the planned regional cleaning, returning to step S42; and when there is no uncleaned region in the direction towards the first side of the currently-cleaned region, selecting, by the robot, one of the at least one uncleaned region, which is in the direction perpendicular to the current cleaning direction and towards a second side of the currently-cleaned region and takes a region boundary of the second side of the currently-cleaned region as an adjacent side, to perform planned regional cleaning, the cleaning direction being changed to the direction towards the second side of the currently-cleaned region, and after cleaning, returning to step S42; wherein the first side of the currently-cleaned region is a side of the currently-cleaned region where the base point is located, and the second side of the currently-cleaned region is the other side, opposite to the first side, of the currently-cleaned region.

20. The chip according to claim 17, wherein performing the planned regional cleaning by the robot comprises:

step S61: from the base point, performing, by the robot, the planned cleaning in a 弓-shaped trajectory form, proceeding to step S62;

step S62: determining, by the robot, in real time whether there is at least one cleaning-missed region during a cleaning process, when there is the at least one cleaning-missed region during the cleaning process, proceeding to step S63, and otherwise, continuing the planned cleaning, until the planned regional cleaning is completed; and step S63: determining, by the robot, a current position point as a supplementary-cleaning starting point, and starting to perform supplementary cleaning on the at least one cleaning-missed region from the supplementary-cleaning starting point, after the supplementary cleaning, returning, by the robot, to the supplementary-cleaning starting point, continuing to perform planned cleaning on a remaining uncleaned region, and returning to step S62;

wherein completion of the planned regional cleaning means that when the robot cleans to a region boundary, a virtual boundary or a physical boundary along the cleaning direction, the cleaning of the region is completed.

* * * * *